United States Patent [19]

Monnet

[11] Patent Number: 4,909,932
[45] Date of Patent: Mar. 20, 1990

[54] DEVICE FOR FILTRATION OF LIQUIDS, INCLUDING DETACHABLE COVER AND DETACHABLE CLOSURE

[76] Inventor: Bertrand Monnet, 6 Boulevard Chardon Murs Erigne, 49130 Les Ponts De Ce, France

[21] Appl. No.: 129,218

[22] Filed: Dec. 7, 1987

[51] Int. Cl.⁴ .................................... B01D 15/04
[52] U.S. Cl. ........................ 210/98; 210/136; 210/284; 210/297; 210/316; 210/359
[58] Field of Search .............. 210/98, 108, 198.1, 210/203, 206, 259, 260, 262, 282, 297, 316, 388, 391, 392, 357, 470, 780, 411, 393, 661, 136, 284, 359; 55/79, 475

[56] References Cited

U.S. PATENT DOCUMENTS

| | | | |
|---|---|---|---|
| 620,621 | 3/1899 | Veazie | 210/284 |
| 3,374,052 | 3/1968 | Fan et al. | 55/475 |
| 4,048,071 | 9/1977 | Yamada et al. | 210/282 |
| 4,054,526 | 10/1977 | Muller | 210/282 |
| 4,253,947 | 3/1981 | Fan et al. | 55/79 |
| 4,283,283 | 8/1981 | Zimmerman | 210/282 |
| 4,287,057 | 9/1981 | Stanley | 210/282 |
| 4,389,311 | 6/1983 | LaFreniere | 210/282 |
| 4,430,226 | 2/1984 | Hegde et al. | 210/259 |
| 4,624,789 | 11/1986 | Fan et al. | 210/661 |
| 4,635,663 | 1/1987 | Rollins et al. | 210/282 |

Primary Examiner—Richard V. Fisher
Assistant Examiner—Joseph Drodge
Attorney, Agent, or Firm—Sughrue, Mion, Zinn, Macpeak & Seas

[57] ABSTRACT

A liquid filtration device includes a tubular container having an end wall at one end with an emptying orifice therein and a detachable cover closing the opposite end. A filling orifice is disposed in the container adjacent to the cover and a fixed filter is secured in the container immediately adjacent the emptying orifice. A movable filter is disposed in the container for movement between the cover and the fixed filter by means of an operating component connected to the movable filter and extending outwardly of the container.

8 Claims, 4 Drawing Sheets

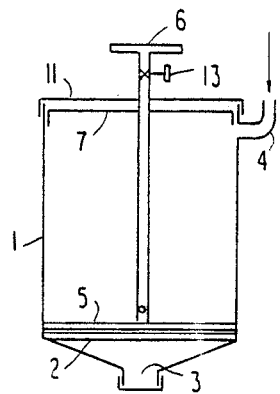
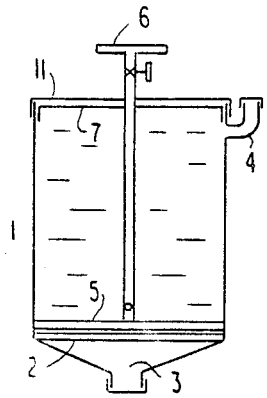
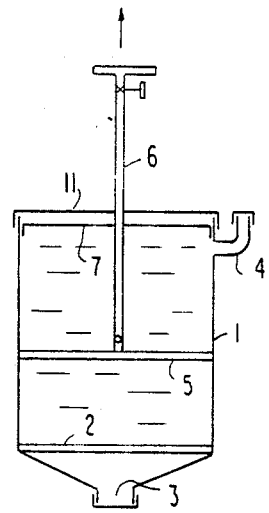
FIG.2a     FIG.2b     FIG.2c
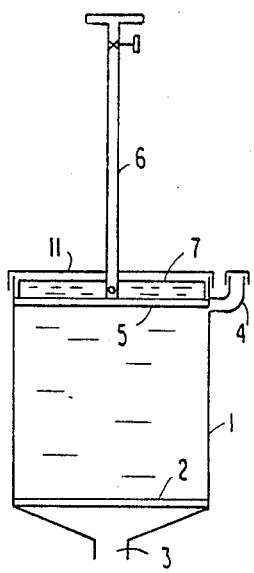
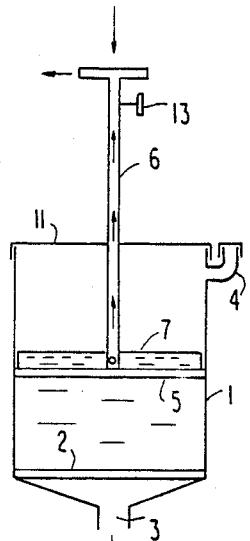
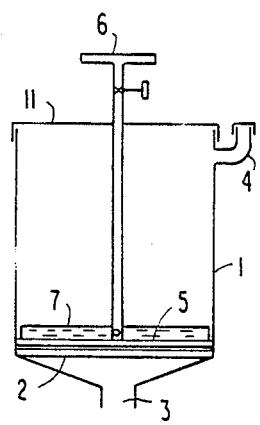
FIG.2d     FIG.2e     FIG.2f

DEVICE FOR FILTRATION OF LIQUIDS, INCLUDING DETACHABLE COVER AND DETACHABLE CLOSURE

FIELD OF THE INVENTION

The present invention relates to a method and an individual device for the filtration of liquid and, in particular, of soft water. In particular, the object of this method and this device are to render drinkable any polluted soft water, whatever its degree of pollution.

BACKGROUND OF THE INVENTION

The rendering drinkable of a water can be carried out either by a solely mechanical means, that is by passage of water through a filtering unit, or by mechanical and chemical means, that is by filtration combined with the action of chemical products on the materials in suspension.

Individual devices exist which are conceived to respond to these needs, but their performances are limited. The first group are apparatuses equipped with filter candles. The filtration unit is composed of one or several porcelain candles with controlled porosity. The filtration takes place from the exterior of the candle towards the interior. Clogging of the candle is rapid and the filtration output is very low (less than one to a few liters per hour). Other apparatuses are equipped with filtration membranes or cartridges. The operating principle of these apparatuses resides in the passage of the water through one or several microfiltration membranes. However, these devices clog easily and are ineffective with regard to chemical and bacterial pollution.

SUMMARY OF THE INVENTION

An object of the device in accordance with the present invention is to overcome these disadvantages. It does not clog and has increased effectiveness on chemical and bacterial pollution.

The method, which is also the object of the invention, is of simple conception and is simple to use.

In accordance with the invention, the filtration method, inside a tubular container containing a fixed filter, comprises the following successive steps:

firstly, filtering a liquid through the movable filter connected to an operating component separated from but adjacent to the position of a fixed filter to carry out a first filtration, and then secondly filtering the liquid through a movable filter brought closer to the fixed filter in order to carry out a second filtration through the fixed filter.

In accordance with a specific embodiment, during the second filtration a declogging operation of the movable filter is carried out by passage, through the movable filter, of part of the water filtered the first time.

In accordance with another embodiment, the declogging operation is carried out during the second filtration by connection of the operating component with a sealed cover so as to create a decompression chamber at the level of the clogged area located at the upper surface of the movable filter.

BRIEF DESCRIPTION OF THE DRAWINGS

FIGS. 2a-2f represent the different steps used in the first embodiment of the invention;

DETAILED DESCRIPTION OF THE INVENTION

The individual filtration device in accordance with the invention is composed of a tubular container provided with a filter, which is fixed to one end of an emptying orifice and to the other end of a filling orifice, and with a removable cover and is characterized in that the container further contains a movable filter which is connected to an operating component.

In accordance with a first embodiment, the container contains a second movable cover which can be connected to the operating component and which is located at a distance from the first movable filter in order to define a chamber therebetween.

In accordance with a second embodiment, the filling and emptying orifices are plugged by valves whose opening is caused by bringing closer the fixed filter and the movable filter, and whose closing is caused by the moving away of the two filters.

Other characteristics and advantages of the invention will become apparent from the detailed, non-limiting description of two embodiments of the invention. This description below refers specifically to the attached drawings.

Figure 1:
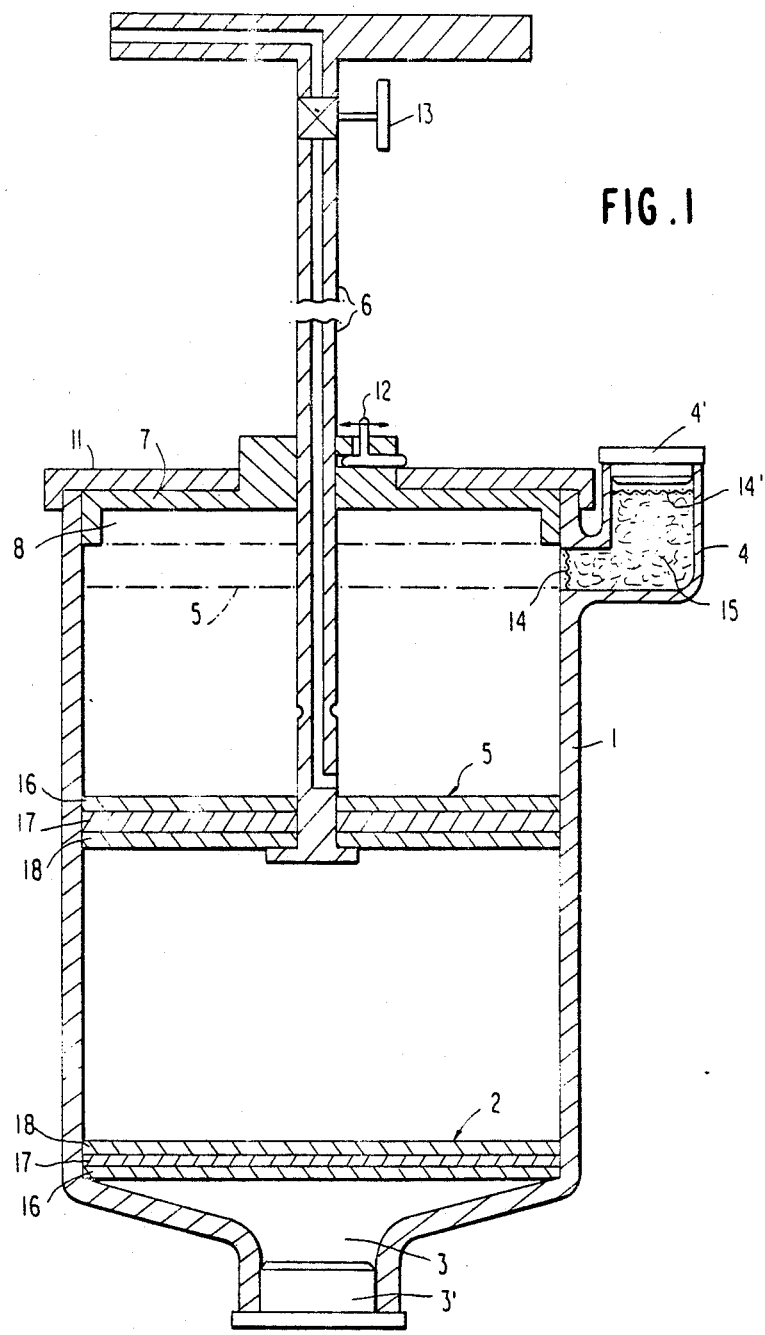
FIG. 1 represents a longitudinal section of a first embodiment of the invention.

The individual water filtration device in accordance with the invention illustrated in FIG. 1 is presented in the form of a tubular container 1. It contains, at one end, an emptying orifice 3 which can receive a plug 3', and at the other end, laterally, a filling pipe 4 which, also, can receive a plug 4'.

A fixed filter 2, preferably situated immediately above the emptying hole 3, is placed inside the tubular container. Another filtering element 5 is movable and connected to an operating component 6.

Cover 11 comprises two parts. The lower part 7 can be connected to the operating component 6 by a pin 12 so as, with the movable filter 5, the internal surface and the edge of cover 7, to define a chamber 8.

The operating component 6, which is shown here in the form of a stem and a handle, is hollow. This cavity has a valve 13 at one end and exits at the other end above the movable filter 5 so as to create a decompression in the chamber 8 when the valve is open.

Filters 2 and 5 are composed of several layers of different materials. Filter 5 is composed of an upper membrane 16, an intermediate layer of active carbon 17 and a lower layer of ion-exchanging material 18. Filter 2 is composed of an upper layer of ion-exchanging material 18, an intermediate layer of active carbon 17 and a lower layer composed of a membrane 16 whose filtration threshold is lower than the filtration threshold of the membrane of the movable filter, that is, the fixed filter is capable of filtering finer particles than the movable filter.

However, the arrangement of layers 17 and 18 cannot be reversed.

At its ends the filling pipe 4 has two permeable sieves 14 and 14' between which are placed a disinfectant and a flocculating agent 15 which, during filling of the container, are intended to coagulate and flocculate the colloids and the materials suspended in the water and to provide disinfection and oxidation of the organic materials. The raw water introduced therein dissolves a sufficient quantity of substance and takes it into the interior of the container where it acts.

FIG. 2 illustrates, very schematically, the various steps of use of the device described above.

In order to carry out the filtration of the water, the following takes place: with the filling pipe 4 open, the container 1 is filled while the movable filter 5 is in the low position (step I), then pipe 4 is closed (step II). This can be left to rest for a few minutes so that the substances placed in pipe 4 can act and then, possibly, it is shaken. From this adjacent position of the two filters, the movable filter is raised in order to carry out a first filtration therethrough (step III). During this filtration, the materials in suspension are retained at the upper surface of the membrane of the movable filter.

The movable cover 7 is then connected to the operating component 6 using connection means 12 (step IV) and valve 13 is opened. The opening of valve 13, which can be a needle valve, is rapid and of short duration in order to carry out a sufficient decompression to declog the surface of the filter. The operation can be repeated several times if this is necessary.

After having removed the plug from the emptying orifice 3, the movable filter is brought closer to the fixed filter so as to carry out a second filtration through the fixed filter and drinkable water is then recovered (steps V and VI).

The materials in suspension which are passed through the movable filter during the first phase are retained by the fixed filter whose membrane has a slightly lower filtration threshold than that of the movable filter.

Figure 3:
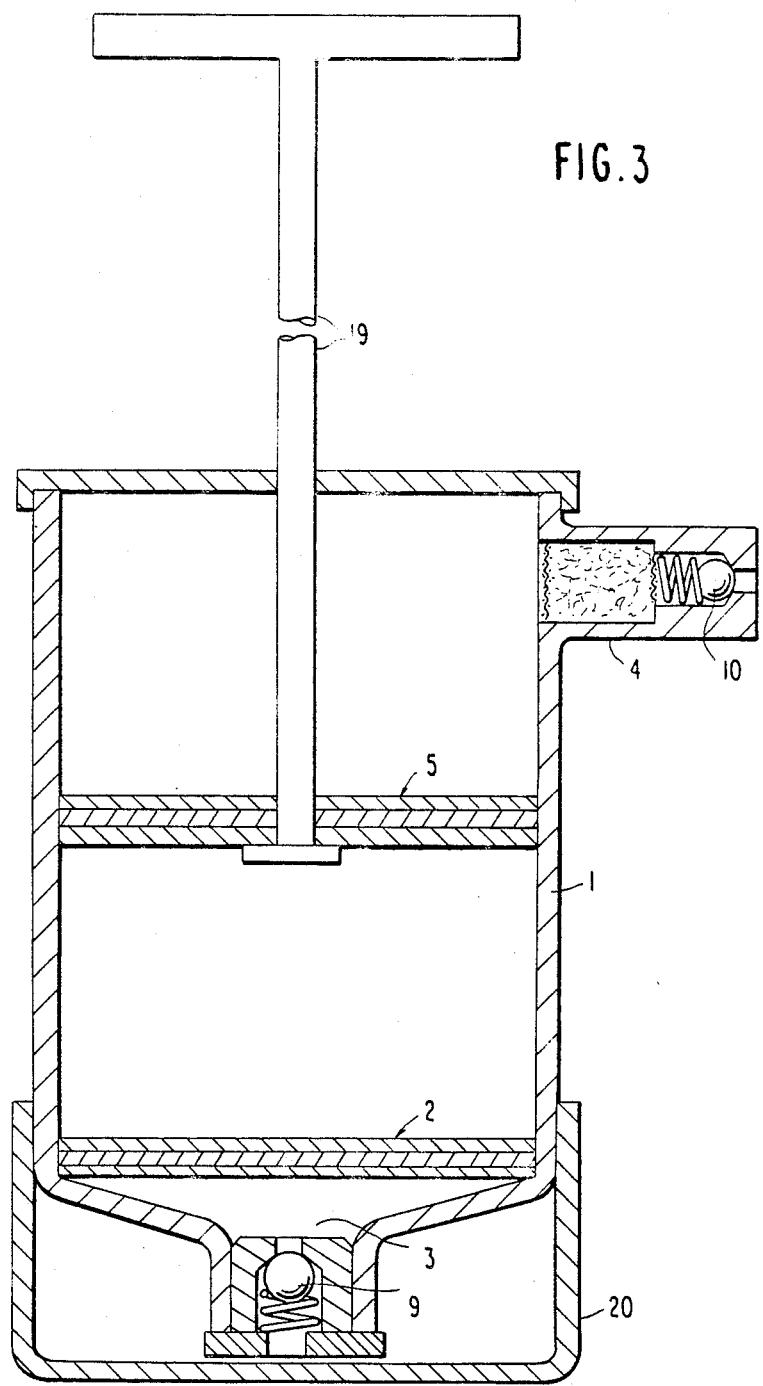
FIG. 3 illustrates a longitudinal section of a second embodiment.
Figure 4A:
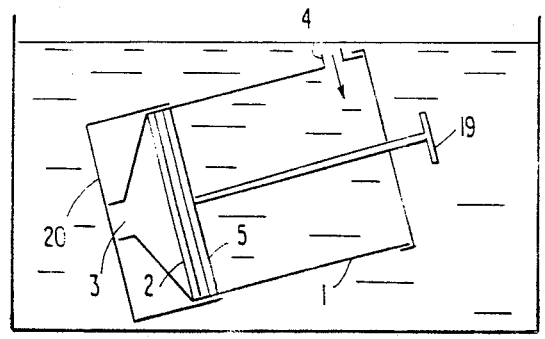
FIGS. 4a-4d represent the different steps used in the second embodiment.
Figure 4B:
Figure 4B:
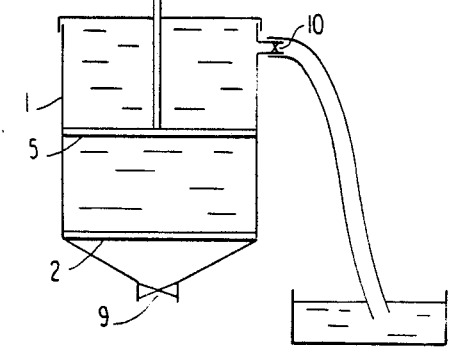
Figure 4C:
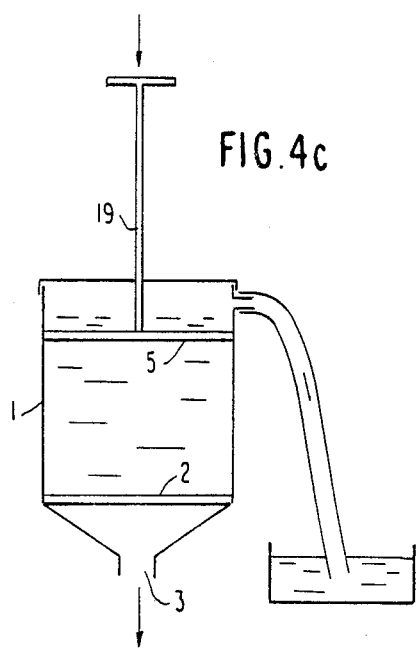
Figure 4D:
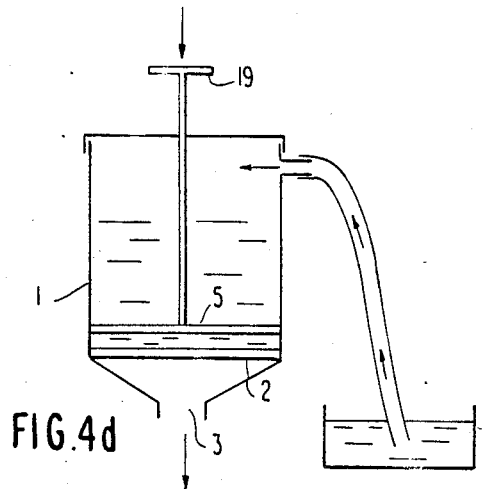

Referring to the FIG. 3, which illustrates a longitudinal section of a second embodiment of the invention, container 1 is provided with an emptying orifice 3, a filling pipe 4 and a fixed filter 2 of the same type as in the first embodiment. The movable filter 5 is connected to a solid operating component 19, for example a stem fitted with a handle. The container further includes a first valve 9 which blocks orifice 3 and a second valve 10 at the base of pipe 4. These valves open when the movable filter is brought closer to the fixed filter. The device further contains a protective casing 20 which can be adapted on the lower part of container 1.

FIG. 4 illustrates the different steps of use of the second embodiment of the invention.

The filtration is then carried in accordance with the following steps: with the filling pipe open, the movable filter 5 is brought closer to the fixed filter 2 and the device is plunged into the raw water; valves 9 and 10 are opened and the water remains inside the container (step I). When the movable and fixed filters are in an adjacent position, the movable filter is raised to carry out a first filtration therethrough; the valves are then in a closed position (step II). The emptying orifice 3 is opened and the movable filter is brought closer to the fixed filter to carry out a second filtration through the fixed filter. The valves are then again opened and the filtered water is then removed (step III).

When it is engaged, casing 20 enables the lower part of the container not to be soiled when it is plunged into the raw water. When detached from the container, it can then act as a water reservoir.

By connecting the filling pipe to a pipe plunged into the water source or by filling the apparatus through casing 20, continuous filtration can be carried out. In effect, during the second filtration, the filtered water is emptied while raw water is drawn in and fills the container above the movable filter. The operation is then repeated several times and continuous filtration is carried out (step IV).

During the second filtration, a declogging operation of the movable filter is carried out by passage through the movable filter of part of the water filtered the first time.

It would be useful, after a few uses, for example about ten, to disassemble the device in order to rinse its components, in particular the movable filter.

I claim:

1. A liquid filtration device comprising a tubular container having an end wall with an emptying orifice therein, detachable closure means closing said emptying orifice, detachable cover means closing the opposite end of said container, a filling orifice in said tubular container adjacent said detachable cover means, a fixed filter secured in said container immediately above said emptying orifice, a movable filter disposed in said container for movement between said fixed filter and said detachable cover means and operating means connected to said movable filter means and extending outwardly of said container for moving said movable filter from a first position adjacent said fixed filter to a second position adjacent said covering means to pass liquid through said movable filter and for moving said movable filter from said second position to said first position to force liquid through said fixed filter when said closure means is detached.

2. A liquid filtration device as set forth in claim 1 further comprising first one-way valve means and second one-way valve means for normally blocking said emptying orifice and said filling orifice, respectively, the first and second one-way valve means being opened when said movable filter is moved toward said fixed filter.

3. A liquid filtration device as set forth in claim 1, wherein said cover means is comprised of a first cover detachably connected to said tubular container and a second cover located inside said tubular container for sliding movement along said container, said first and second covers having apertures through which said operating means extend and connecting means for detachably connecting said second cover to said operating means in a location spaced from said movable filter to define a chamber within said tubular container between said second cover and said movable filter.

4. A liquid filtration device as set forth in claim 3, wherein said operating means is comprised of an elongated stem having a longitudinal passage extending therethrough with one end of the passage disposed in communication with said chamber adjacent said movable filter and valve means in said passage externally of said tubular container for opening and closing the opposite end of said passage whereby upon opening of said valve means the pressure in said container may be reduced relative to the pressure in said container between said fixed filter and said movable filter to unclog the surface of said movable filter in said chamber.

5. A liquid filtration device as set forth in any one of claims 1-4, further comprising a pipe connected to said filling orifice and having two permeable sieves disposed at opposite ends of the pipe, respectively, with a disinfectant and flocculating agent therebetween to coagulate and flocculate colloids and other materials suspended in the liquid and to provide disinfection and oxidation of organic materials.

6. A liquid filtration device as set forth in any one of claims 1-4, wherein said movable filter comprises an upper membrane, an intermediate layer of activated carbon and a lower layer of ion-exchange material.

7. A liquid filtration device as set forth in any one of claims 1-4, wherein said fixed filter comprises an upper layer of ion exchange material, an intermediate layer of activated carbon and a lower membrane whose filtration threshold is lower than the membrane of said movable filter.

8. A liquid filtration device as set forth in any one of claims 1-4, further comprising an end casing detachably connected to said container to cover said emptying orifice.

* * * * *